US008484272B2

(12) United States Patent
Gore et al.

(10) Patent No.: US 8,484,272 B2
(45) Date of Patent: Jul. 9, 2013

(54) UNIFIED PULSE SHAPING FOR MULTI-CARRIER AND SINGLE-CARRIER WAVEFORMS

(75) Inventors: Dhananjay Ashok Gore, San Diego, CA (US); Avneesh Agrawal, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1801 days.

(21) Appl. No.: 11/022,537

(22) Filed: Dec. 22, 2004

(65) Prior Publication Data

US 2006/0039273 A1 Feb. 23, 2006

Related U.S. Application Data

(60) Provisional application No. 60/603,346, filed on Aug. 20, 2004.

(51) Int. Cl.
*G06F 17/14* (2006.01)

(52) U.S. Cl.
USPC ............ 708/400; 708/300; 375/136; 370/208

(58) Field of Classification Search
None
See application file for complete search history.

(56) References Cited

U.S. PATENT DOCUMENTS

| 6,751,267 | B1* | 6/2004 | Schill et al. ................... 375/296 |
| 6,947,509 | B1* | 9/2005 | Wong ........................... 375/350 |
| 7,020,072 | B1 | 3/2006 | Li et al. |
| 7,295,626 | B2 | 11/2007 | Chayat |
| 2004/0081131 | A1* | 4/2004 | Walton et al. ................. 370/344 |
| 2004/0125740 | A1 | 7/2004 | Gardner ........................ 370/208 |
| 2004/0131007 | A1 | 7/2004 | Smee et al. |
| 2004/0218521 | A1 | 11/2004 | Bolinth et al. |
| 2006/0078075 | A1* | 4/2006 | Stamoulis et al. ............ 375/346 |

FOREIGN PATENT DOCUMENTS

| JP | 7226724 A2 | 8/1995 |
| JP | 2002009735 | 1/2002 |
| JP | 2005538659 | 12/2005 |
| JP | 2006287895 A | 10/2006 |
| JP | 2008509621 A | 3/2008 |
| WO | 0141320 | 6/2001 |
| WO | WO03013050 A1 | 2/2003 |
| WO | WO03047118 | 6/2003 |
| WO | WO2006011360 | 2/2006 |
| WO | WO2006011376 | 2/2006 |
| WO | WO2006013693 | 2/2006 |

OTHER PUBLICATIONS

International Search Report—PCT/US2005/029506, International Search Authority—European Patent Office—Jan. 12, 2006.
Kobayashi et al. : "Signal Carrier OFDM Technique with Adaptive Modulation Method," Electronics and Communication Engineers Institute Treatise vol. J86-A, No. 12, pp. 1329-1339, Dec. 1, 2003.
Written Opinion—PCT/US2005/029506, International Search Authority—European Patent Office—Jan. 12, 2006.
Kazuhiro Kawasaki, et al., "OFDM Utilizing Pre-FFT Processing, Studies of Schemes for Reducing Signal Peak Power," Report of Electronics, Information and Communication Engineers Institute Research published by Institute of Electronics, Information and Communication Engineers, Aug. 31, 2001, pp. 59-66, RCS2001-110.
Taiwan Search Report—TW094128406—TIPO—Mar. 19, 2012.

* cited by examiner

*Primary Examiner* — Michael D Yaary
(74) *Attorney, Agent, or Firm* — Donald C. Kordich

(57) ABSTRACT

To transmit a multi-carrier signal, a transmitter provides zero symbols for guard subbands, performs OFDM modulation, and filters the resultant time-domain samples with a pulse shaping filter. To transmit a single-carrier signal, the transmitter partitions the single-carrier signal into segments. Each segment contains up to K samples and is padded, if needed, to the length of an OFDM symbol. Each padded segment is transformed from the time domain to the frequency domain to generate a corresponding frequency-domain segment with K symbols. For each frequency-domain segment, the symbols corresponding to the guard subbands are set to zero. Each frequency-domain segment is then transformed from the frequency domain to the time domain to generate a corresponding time-domain segment. A cyclic prefix may or may not be appended to each time-domain segment. Each time-domain segment is filtered with the same pulse shaping filter to generate an output waveform for the single-carrier signal.

39 Claims, 7 Drawing Sheets

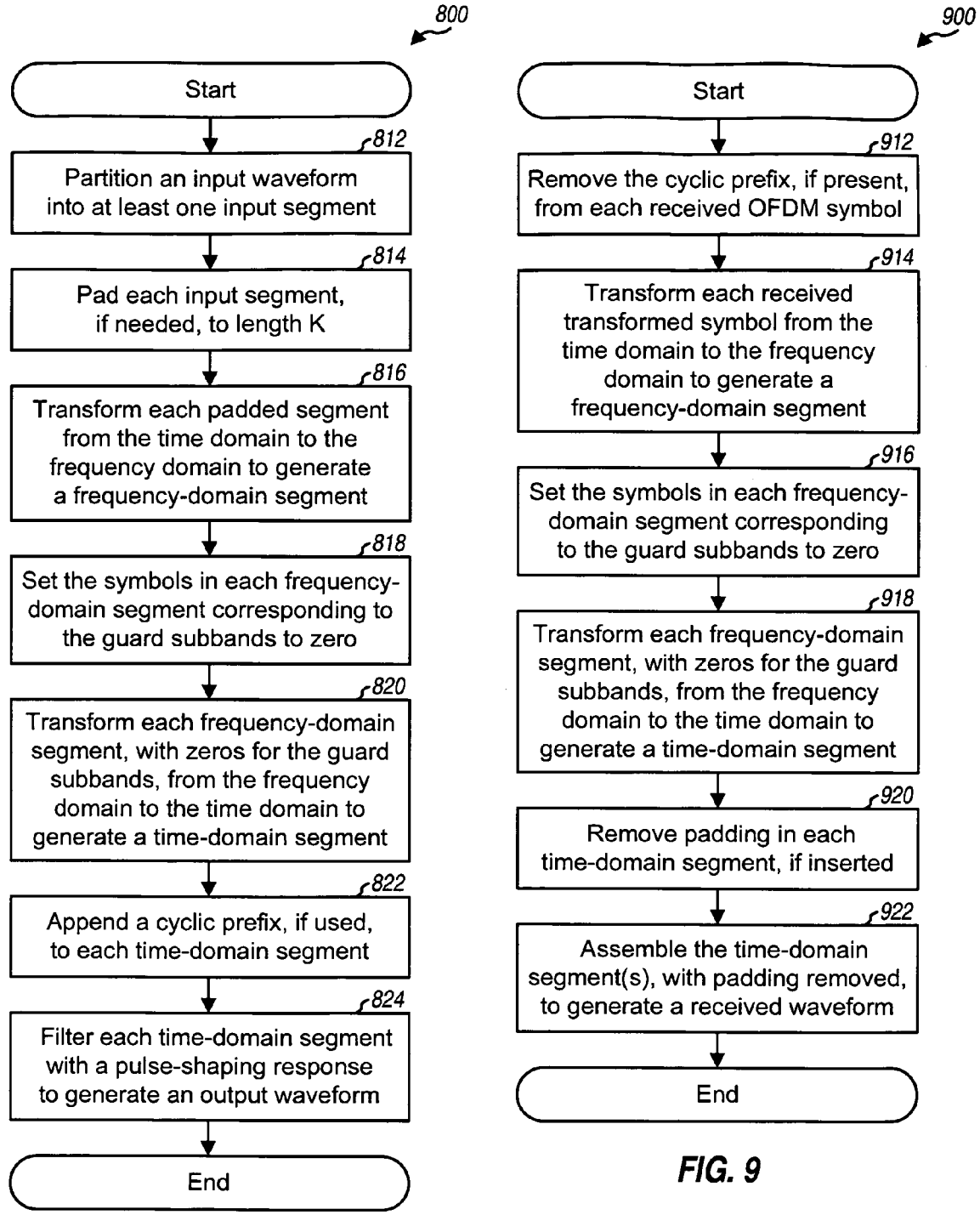

UNIFIED PULSE SHAPING FOR MULTI-CARRIER AND SINGLE-CARRIER WAVEFORMS

This application claims the benefit of provisional U.S. application Ser. No. 60/603,346, entitled "Unified Pulse-Shaping for Multi-Carrier and Single-Carrier Waveforms," filed Aug. 20, 2004.

BACKGROUND

I. Field

The present invention relates generally to communication, and more specifically to techniques for processing signals for transmission via a communication channel.

II. Background

A multi-carrier communication system utilizes multiple carriers for data transmission. These multiple carriers may be obtained with orthogonal frequency division multiplexing (OFDM), discrete multi-tone (DMT), some other multi-carrier modulation schemes, or some other construct. OFDM effectively partitions the overall system bandwidth into multiple (K) orthogonal subbands, which are also commonly called tones, subcarriers, bins, and frequency channels. With OFDM, each subband is associated with a respective subcarrier that may be modulated with data. The data is thus often considered as being transmitted in the frequency domain on a multi-carrier signal. In the following description, the terms "signal" and "waveform" are synonymous and are used interchangeably.

A transmitter in a multi-carrier system typically performs pulse shaping or windowing on a multi-carrier signal prior to transmission via a communication channel. This pulse shaping filters the multi-carrier signal such that its frequency components conform to a spectral mask specified for the system. The pulse shaping ensures that the multi-carrier signal causes negligible interference to other signals that may be transmitted on adjacent frequency bands or radio frequency (RF) channels.

It is sometimes useful to transmit a single-carrier signal in the multi-carrier system. The single-carrier signal may have certain desirable characteristics and may be generated using various techniques, e.g., a spread spectrum technique. The transmitter typically also performs pulse shaping on the single-carrier signal prior to transmission via the communication channel. Unfortunately, the pulse shaping for the single-carrier signal may be very different from the pulse shaping for the multi-carrier signal, as described below. This difference can complicate the design of the transmitter and may pose a problem, e.g., if the system is required to meet different spectral masks.

There is therefore a need in the art for techniques to efficiently process single-carrier and multi-carrier signals for transmission via a communication channel.

SUMMARY

Techniques for processing single-carrier and multi-carrier signals in an efficient manner using "unified" pulse shaping are described herein. A transmitting station processes a multi-carrier signal in the normal manner for a multi-carrier system. This multi-carrier processing may include setting certain designated subbands (which are called guard subbands) to zero, performing multi-carrier (e.g., OFDM) modulation, and filtering time-domain samples generated by the multi-carrier modulation with a pulse shaping filter. The guard subbands and the pulse shaping filter response are selected to meet the spectral mask required for the system.

To transmit a single-carrier signal, the transmitting station first converts the single-carrier signal to a multi-carrier format and then performs multi-carrier modulation on the converted single-carrier signal to generate an output signal. For an OFDM system, the transmitting station partitions the single-carrier signal into input segments. Each input segment contains up to K samples and is padded, if needed, to obtain a padded segment of length K. Each padded segment is then transformed from the time domain to the frequency domain (e.g., with a K-point FFT) to generate a corresponding frequency-domain segment with K symbols. For each frequency-domain segment, the symbols corresponding to the guard subbands are set to zero. Each frequency-domain segment, with zeros for the guard subbands, is then transformed from the frequency domain to the time domain (e.g., with a K-point IFFT) to generate a corresponding time-domain segment. A cyclic prefix may or may not be appended to each time-domain segment, depending on the system design. The time-domain segments are filtered with the same pulse shaping filter used for the multi-carrier signal to generate the output signal for the single-carrier signal.

A receiving station performs the complementary processing to receive the single-carrier and multi-carrier signals transmitted by the transmitting station, as described below. Various aspects and embodiments of the invention are also described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIG. 8 shows a process for transmitting a single-carrier signal.

FIG. 9 shows a process for receiving a single-carrier signal.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The unified pulse shaping techniques described herein may be used in conjunction with various multi-carrier modulation schemes. For clarity, these techniques are described for a system utilizing OFDM. In the following description, "k" is generally used as an index for frequency subband, and "n" is generally used as an index for sample period.

Figure 1A:
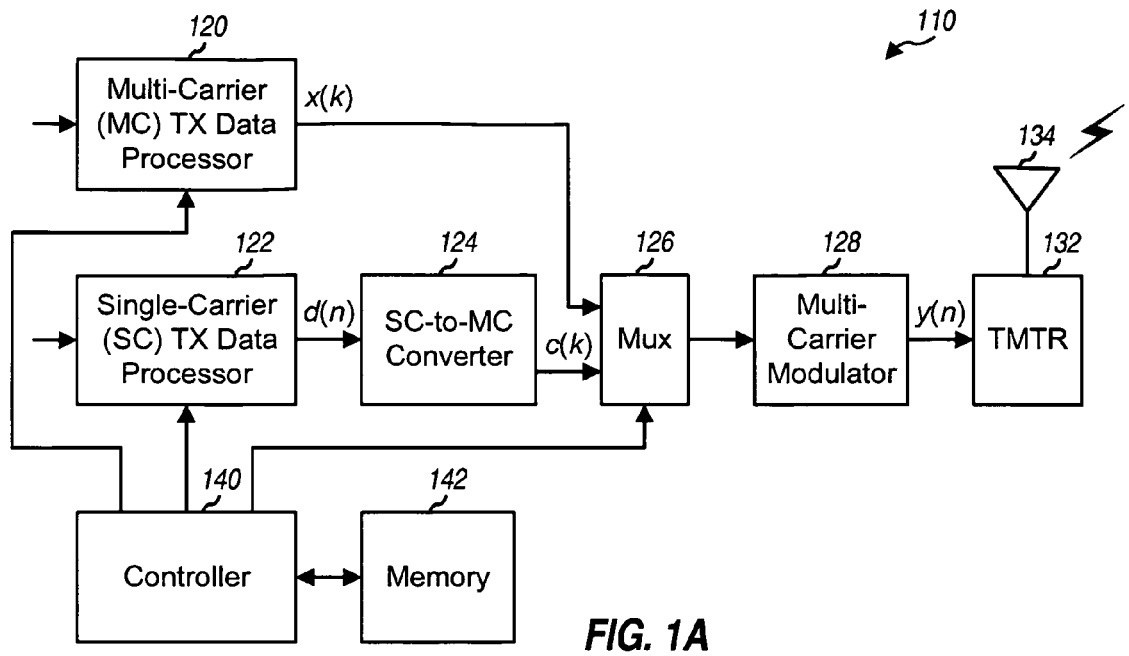
FIG. 1A shows a block diagram of a transmitting station.

FIG. 1A shows a block diagram of a transmitting station 110 in a wireless communication system. At transmitting station 110, a multi-carrier TX data processor 120 receives and processes data in accordance with a first processing scheme and provides data symbols. The first processing scheme may include encoding, interleaving, symbol mapping, and so on. As used herein, a data symbol is a modulation symbol for data, a pilot symbol is a modulation for pilot (which is known a priori by both the transmitting and receiving stations), and a modulation symbol is a complex value for a point in a signal constellation for a modulation scheme (e.g., M-PSK, M-QAM, and so on). With OFDM, one data symbol may be sent on each subband used for data transmission in each OFDM symbol period. TX data processor 120 also performs additional processing on the data symbols, as described below, and provides transmit symbols, which are denoted as x(k). Each transmit symbol is a complex value to be sent on one subband in one OFDM symbol period. The output of TX data processor 120 is a multi-carrier signal, which may be considered as a frequency-domain signal.

A single-carrier TX data processor 122 receives and processes data in accordance with a second processing scheme and provides data samples, which are denoted as d(n). The second processing scheme may include encoding, interleaving, symbol mapping, and so on, or no processing at all. A data sample is a real or complex value to be sent in one sample period. A sample period and an OFDM symbol period are related as described below. The output of TX data processor 122 is a single-carrier signal, which may be considered as a time-domain signal. A single-carrier to multi-carrier (SC-to-MC) converter 124 receives the data samples d(n) from TX data processor 122, converts the data samples from the time domain to the frequency domain, performs other pertinent processing as described below, and provides frequency-domain converted symbols, which are denoted as c(k). A multiplexer (Mux) 126 receives the transmit symbols x(k) from processor 120 and the converted symbols c(k) from SC-to-MC converter 124 and multiplexes these symbols based on a MC/SC control provided by a controller 140. For example, multiplexer 126 may provide the converted symbols c(k) to a multi-carrier modulator 128 for some designated OFDM symbol periods and may provide the transmit symbols x(k) to multi-carrier modulator 128 for the remaining OFDM symbol periods. Alternatively, for each subband in symbol period, multiplexer 126 may add the converted symbol c(k) with the transmit symbol x(k) and provide a combined symbol to multi-carrier modulator 128.

Multi-carrier modulator 128 performs OFDM modulation on the multiplexed transmit symbols x(k) and converted symbols c(k) to generate OFDM symbols and further performs pulse shaping on the OFDM symbols, as described below. In general, multi-carrier modulator 128 performs modulation in accordance with the multi-carrier modulation scheme used by the system. A transmitter unit (TMTR) 132 receives the OFDM symbols from modulator 128, converts the OFDM symbols into one or more analog signals, and conditions (e.g., amplifies, filters, and frequency upconverts) the analog signal(s) to generate a modulated signal. Transmitting station 110 then transmits the modulated signal via an antenna 134.

Controller 140 directs operation at transmitting station 110. A memory unit 142 stores program codes and data used by controller 140.

Figure 1B:
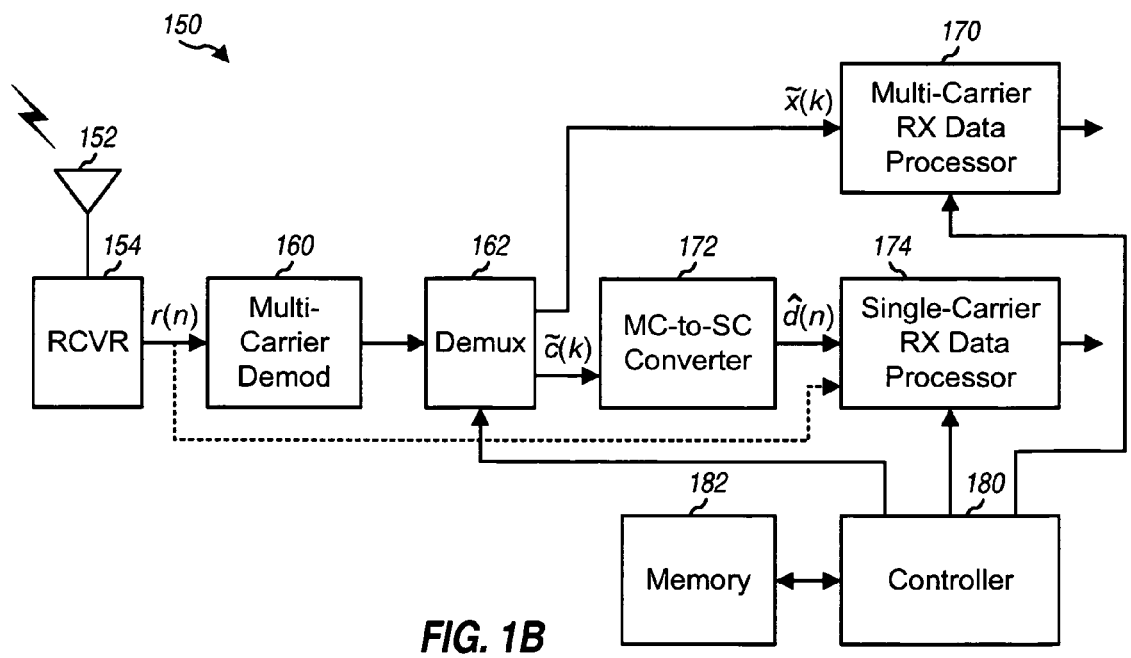
FIG. 1B shows a block diagram of a receiving station.

FIG. 1B shows a block diagram of a receiving station 150 in the wireless communication system. At receiving station 150, the modulated signal transmitted by transmitting station 110 is received by an antenna 152 and provided to a receiver unit (RCVR) 154. Receiver unit 154 conditions (e.g., filters, amplifies, and frequency downconverts) the received signal and digitizes the conditioned signal to generate received samples, which are denoted as r(n). A multi-carrier demodulator (Demod) 160 performs OFDM demodulation on the received samples r(n) and provides received symbols to a demultiplexer (Demux) 162. Demultiplexer 162 provides to a multi-carrier RX data processor 170 the received symbols $\tilde{x}(k)$ corresponding to the transmit symbols x(k) generated by multi-carrier TX data processor 120. Demultiplexer 162 also provides to a multi-carrier to single-carrier (MC-to-SC) converter 172 the received symbols $\tilde{c}(k)$ corresponding to the converted symbols c(k) generated by SC-to-MC converter 124.

Multi-carrier RX data processor 170 processes the received symbols $\tilde{x}(k)$ in a manner complementary to the processing performed by multi-carrier TX data processor 120 and provides decoded data. Multi-carrier RX data processor 170 may perform data detection, symbol demapping, deinterleaving, decoding, and so on, as described below.

MC-to-SC converter 172 processes the received symbols $\tilde{c}(k)$ in a manner complementary to the processing performed by SC-to-MC converter 124 at transmitting station 110 and provides converted samples $\hat{d}(n)$, which are estimates of the data samples d(n) generated by single-carrier TX data processor 122 at transmitting station 110. A single-carrier RX data processor 174 processes the converted samples $\hat{d}(n)$ in a manner complementary to the processing performed by single-carrier TX data processor 122. The processing by RX data processor 174 is typically dependent on the type of data being sent in the single-carrier signal (e.g., traffic data, signaling, pilot, and so on). Alternatively or additionally, RX data processor 174 may obtain the received samples r(n) from receiver unit 154, as indicated by the dashed line in FIG. 1B, and may perform time-domain processing on these received samples to obtain the desired output.

A controller 180 directs operation at receiving station 150. A memory unit 182 stores program codes and data used by controller 180.

For clarity, FIGS. 1A and 1B show the data processing for the single-carrier signal and the multi-carrier signal being performed by two TX data processors 120 and 122 at transmitting station 110 and by two RX data processors 170 and 174 at receiving station 150. The data processing for the single-carrier and multi-carrier signals may also be performed by a single data processor at each of transmitting station 110 and receiving station 150.

Figure 2A:
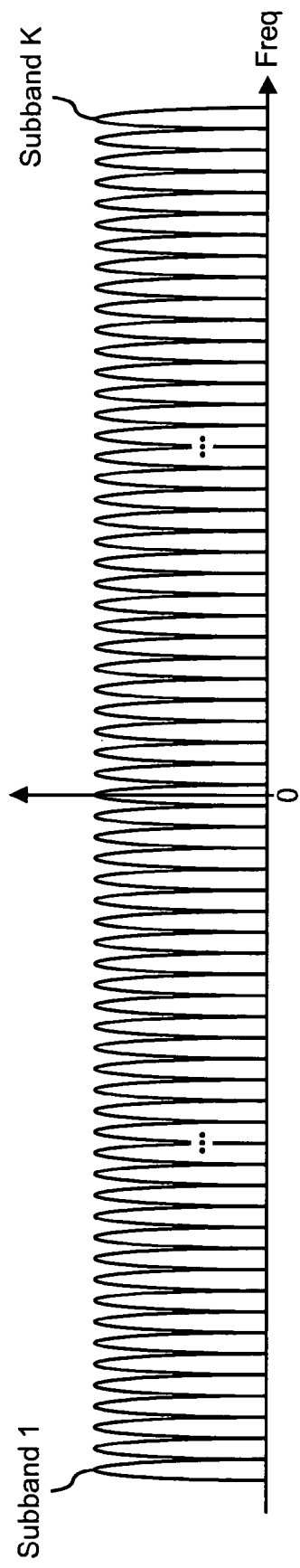
FIGS. 2A and 2B show an OFDM subband structure without and with guard subbands, respectively.

FIG. 2A shows an OFDM subband structure that may be used for the system. The system has an overall system bandwidth of W MHz, which is partitioned into K orthogonal subbands using OFDM. The spacing between adjacent subbands is W/K MHz. In a spectrally shaped OFDM system, only U of the K total subbands may be used for data and pilot transmission, and these U subbands are called usable subbands, where U<K. The remaining G subbands are not used for data or pilot transmission and serve as guard subbands, where K=U+G.

Figure 2B:
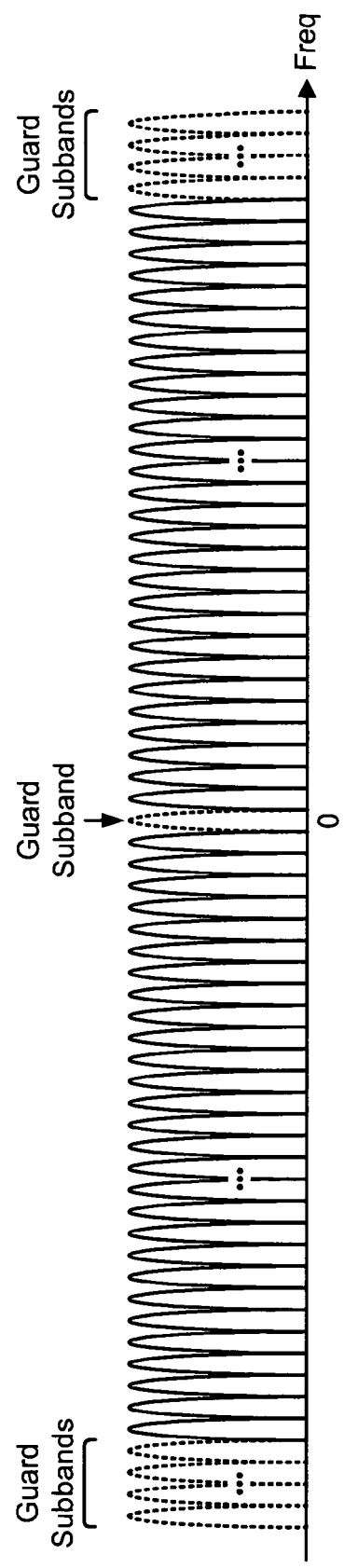
Figure 3:
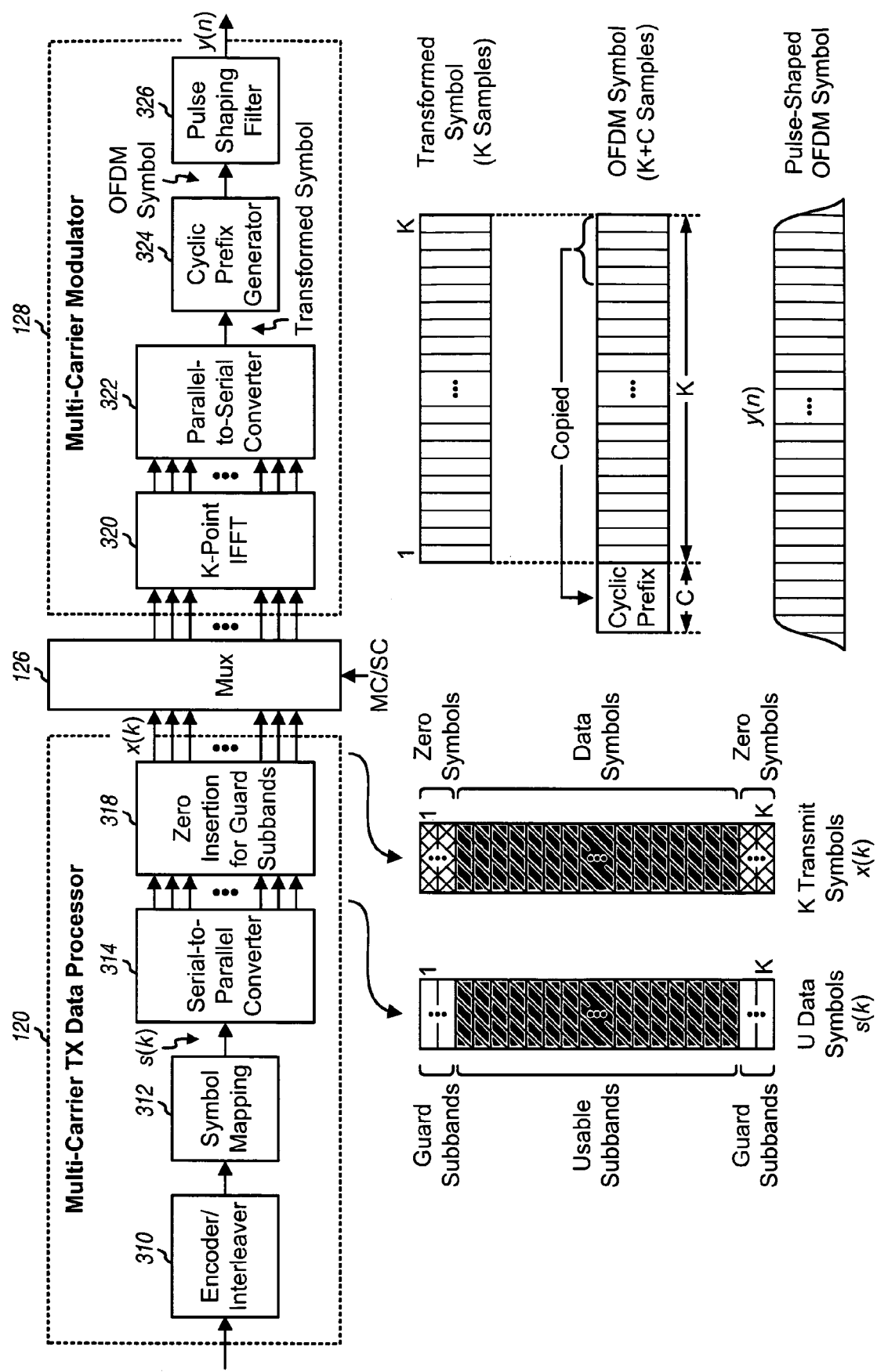
FIG. 3 shows a block diagram of a multi-carrier transmit (TX) data processor and a multi-carrier modulator at the transmitting station.

FIG. 2B shows the OFDM subband structure with the guard subbands indicated by dashed lines. The U usable subbands are typically centered in the middle of the system operating band. The G guard subbands typically include one or more subbands at DC and approximately equal number of subbands at the two band edges. The guard subbands at the band edges allow the system to meet its spectral mask requirements FIG. 3 shows a block diagram of an embodiment of multi-carrier TX data processor 120 and multi-carrier modulator 128 at transmitting station 110. Within TX data processor 120, an encoder/interleaver 310 encodes data based on a selected coding scheme and generates code bits. Encoder/interleaver 310 further interleaves the code bits based on an interleaving scheme to achieve time and/or frequency diversity. A symbol mapping unit 312 maps the interleaved bits based on a selected modulation scheme and provides data symbols, which are denoted as s(k). A serial-to-parallel converter 314 receives the data symbols and maps these data symbols onto the U subbands usable for data transmission. A zero insertion unit 318 inserts a zero symbol (which is a signal value of zero) for each of the G guard subbands and provides K transmit symbols x(k) for each OFDM symbol period. Each transmit symbol may be a data symbol, a pilot symbol, or a zero symbol. Multiplexer 126 passes the transmit symbols from TX data processor 120 to multi-carrier modulator 128 if a multi-carrier signal is being transmitted.

Within multi-carrier modulator 128, an inverse fast Fourier transform (IFFT) unit 320 receives K transmit symbols for the K total subbands in each OFDM symbol period, transforms the K transmit symbols to the time domain with a K-point IFFT, and provides a transformed symbol that contains K time-domain samples. Each time-domain sample is a complex value to be transmitted in one sample period. A parallel-to-serial converter 322 serializes the K samples for each transformed symbol. A cyclic prefix generator 324 repeats a portion (or C samples) of each transformed symbol to form an OFDM symbol that contains K+C samples. The cyclic prefix is used to combat inter-symbol interference (ISI) caused by frequency selective fading, which is a frequency response that varies across the overall system bandwidth. An OFDM symbol period is the duration of one OFDM symbol and is equal to K+C sample periods. IFFT unit 320, parallel-to-serial converter 322, and cyclic prefix generator 324 are often referred to as an OFDM modulator.

A pulse shaping filter 326 receives the OFDM symbols from cyclic prefix generator 324, filters the OFDM symbols in accordance with an impulse response of g(n), and provides output samples, which are denoted as y(n). Filter 326 performs pulse shaping or windowing so that the output samples conform to the spectral mask imposed by the system. Filter 326 may be implemented with a finite impulse response (FIR) filter, an infinite impulse response (IIR) filter, or some other types of filter.

Figure 4:
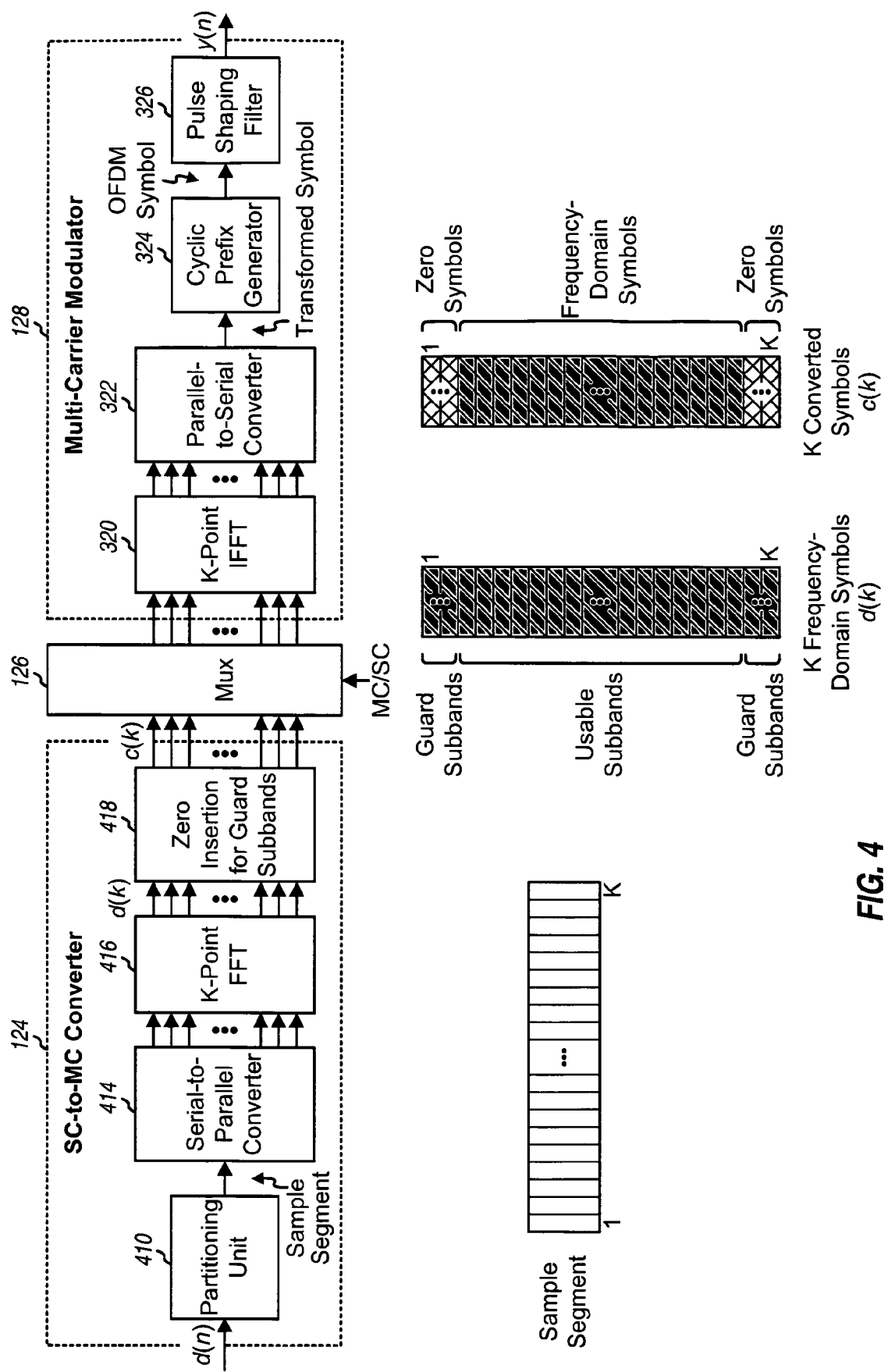
FIG. 4 shows a block diagram of a single-carrier to multi-carrier (SC-to-MC) converter at the transmitting station.

FIG. 4 shows a block diagram of an embodiment of SC-to-MC converter 124 and multi-carrier modulator 128, which represent one embodiment for transmitting a single-carrier signal with multi-carrier modulation. For this embodiment, a partitioning unit 410 within SC-to-MC converter 124 receives the time-domain data samples d(n) for the single-carrier signal and partitions these data samples into segments. Each segment contains up to K data samples to be sent in one OFDM symbol period. For each segment with less than K data samples, partitioning unit 410 inserts a sufficient number of zero samples (which are sample values of zero) to obtain K total samples for the segment. The single-carrier signal is thus broken into segments, each having a length that is compatible with an OFDM symbol. Each segment is sent in one OFDM symbol. A segment may also be called a block, a subblock, or some other terminology.

A serial-to-parallel converter 414 receives the K time-domain samples to be sent in each OFDM symbol period and provides the samples in parallel form. A fast Fourier transform (FFT) unit 416 receives the K samples for each OFDM symbol period, transforms the K data samples to the frequency domain with a K-point FFT, and provides K frequency-domain symbols for the K total subbands. The K frequency-domain symbols and the K time-domain samples are different representations of the same information sent in the single-carrier signal. However, the frequency-domain representation puts the single-carrier signal in a format that is suitable for multi-carrier modulation.

The time-domain data samples d(n) for each segment are likely to have some energy on the guard subbands at the two band edges. To be consistent with OFDM transmission, the frequency components of the time-domain data samples at the guard bands may be removed by setting these guard subbands to zero. A zero insertion unit 418 receives the K frequency-domain symbols for the K total subbands, passes the U frequency-domain symbols for the U usable subbands, replaces the G frequency-domain symbols for the G guard subbands with zero symbols, and provides K converted symbols c(k) for each OFDM symbol period. Each converted symbol may be a frequency-domain symbol or a zero symbol. The zero insertion for the G guard subbands may be performed in the same manner for both the single-carrier signal and the multi-carrier signal. The converted waveform generated by SC-to-MC converter 124 for the single-carrier signal is thus compatible with the OFDM waveform generated by TX data processor 120 for the multi-carrier signal, i.e., the two waveforms have the same spectral characteristics. The converted waveform may then be processed in the same manner as the OFDM waveform. Multiplexer 126 passes the converted symbols c(k) from SC-to-MC converter 124 to multi-carrier modulator 128 if the single-carrier signal is being transmitted.

In a first embodiment, multi-carrier modulator 128 processes the converted symbols c(k) for the single-carrier signal in the manner described above for the transmit symbols x(k) for the multi-carrier signal. The K converted symbols for each OFDM symbol period are transformed to the time domain with a K-point IFFT by IFFT unit 320, serialized by parallel-to-serial converter 322, appended with a cyclic prefix of C samples by cyclic prefix generator 324, and filtered by pulse shaping filter 326 to generate output samples for the single-carrier signal. In a second embodiment, units 320, 322, and 326 process the converted symbols c(k) as in the first embodiment, but cyclic prefix generator 324 does not append any cyclic prefixes for the single-carrier signal. In a third embodiment, units 320, 322, and 326 process the converted symbols c(k) as in the first embodiment, but cyclic prefix generator 324 appends (e.g., shortened or extended) cyclic prefixes of a different length for the single-carrier signal. In general, the single-carrier signal may be appended with no cyclic prefix, a shortened cyclic prefix with less than C samples, a regular cyclic prefix with C samples, or an extended cyclic prefix with more than C samples. If the single-carrier signal is a continuous signal in the time domain, then the single-carrier signal may be sampled in an appropriate manner to account for any cyclic prefix that may be inserted for each OFDM symbol.

For the multi-carrier signal, the spectral mask for the system is satisfied by a combination of (1) the zero insertion for the guard subbands at the two band edges and (2) the frequency response of pulse shaping filter 326. If the data samples d(n) were applied directly to a single-carrier pulse shaping filter that can meet the same spectral mask, then this single-carrier pulse shaping filter would need to have a frequency response that can meet the spectral mask alone without the benefits of the zero insertion for the guard subbands. The single-carrier pulse shaping filter may then be much more complicated than pulse shaping filter 326, which has the benefits of the zero insertion for the guard subbands. Further-more, different deployments of the system in different geographic areas (e.g., different cities or countries) may have different spectral mask requirements. These different spectral masks may require different coefficients for the single-carrier pulse shaping filter, which may further complicate the transmitter design.

Using the unified pulse shaping techniques, the processing by IFFT unit 320, parallel-to-serial converter 322, cyclic prefix generator 324, and pulse shaping filter 326 may be identical for both the transmit symbols x(k) for the multi-carrier signal and the converted symbols c(k) for the single-carrier signal. The pulse shaping may thus be performed in a unified manner for both the single-carrier and multi-carrier waveforms. This greatly simplifies the pulse shaping for both types of signals and allows for easy multiplexing of any waveforms with the multi-carrier waveform. The unified pulse shaping reduces transmitter complexity and simplifies the transmitter design, especially when multiple spectral masks have to be satisfied. For example, different spectral masks may easily be satisfied by (1) changing the number of guard subbands and utilizing the same pulse shaping filter or (2) keeping the same number of guard subbands and changing the pulse shaping filter. In any case, a single pulse shaping filter may be used for both the single-carrier and multi-carrier signals.

The single-carrier signal may carry any type of data such as traffic data, signaling, pilot, and so on. For example, the single-carrier signal may be a pilot that may be used for various functions such as time synchronization, frequency error estimation, transmitter identification, channel estimation, and so on, or any combination thereof. The single-carrier signal may have certain desirable temporal characteristics, which may make the signal useful for acquisition, system access, and so on. The single-carrier signal may also be for an overhead channel used to carry signaling such. as acknowledgments (ACKs), power control commands, rate or signal-to-noise ratio (SNR) information, resource requests, and so on.

FIGS. 3 and 4 show an embodiment in which the single-carrier signal is time division multiplexed (TDM) with the multi-carrier signal, and the two types of signals are transmitted in different OFDM symbol periods. The single-carrier and multi-carrier signals may also be multiplexed or combined in other manners. For example, the single-carrier signal may be frequency division multiplexed (FDM) with the multi-carrier signal such that the two types of signals are sent on different subbands in the same OFDM symbol period. The single-carrier signal may also be code division multiplexed (CDM) with the multi-carrier signal such that both types of signals are transmitted concurrently in the same OFDM symbol period. In this case, the data for the single-carrier signal may be multiplied with an orthogonal code (or a pseudo-random number (PN) code), scaled with a gain that determines the amount of power to use for the single-carrier signal, and added with the multi-carrier signal. In general, the single-carrier and multi-carrier signals may be multiplexed or combined using various schemes. Different multiplexing schemes may be more suitable for different types of data being sent on the single-carrier signal. A pilot may be sent on the single-carrier signal using TDM, FDM, and/or CDM.

Figure 5:
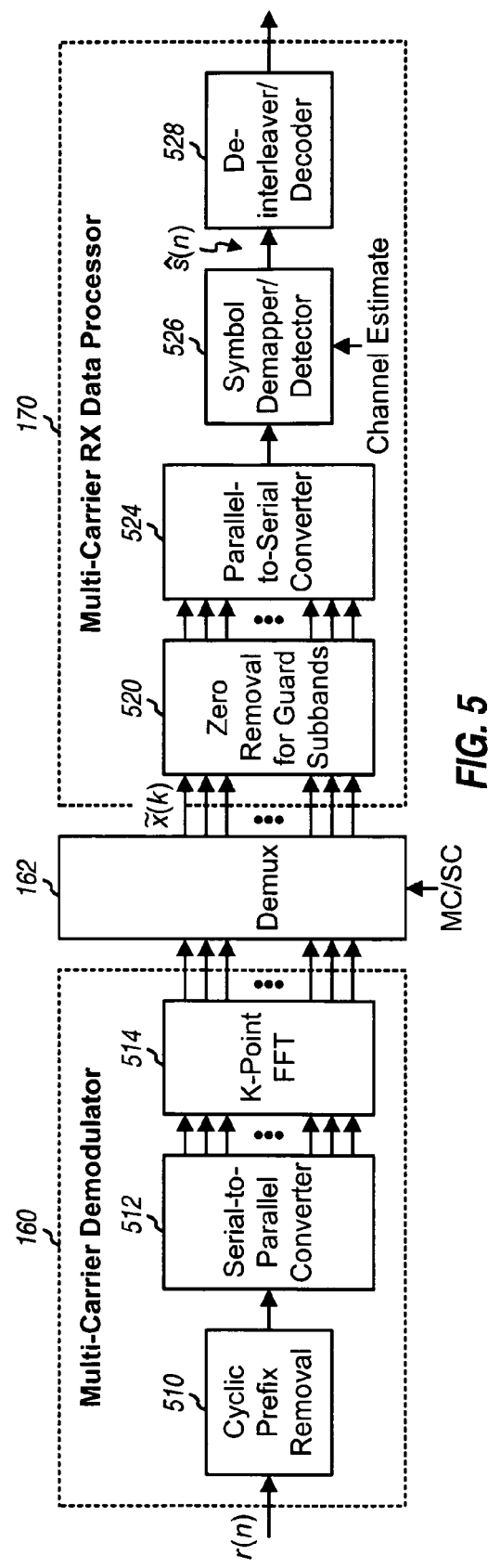
FIG. 5 shows a block diagram of a multi-carrier demodulator and a multi-carrier receive (RX) data processor at the receiving station.

FIG. 5 shows a block diagram of an embodiment of multi-carrier demodulator 160 and multi-carrier RX data processor 170 at receiving station 150. Within multi-carrier demodulator 160, a cyclic prefix removal unit 510 obtains K+C received samples for each OFDM symbol period, removes the cyclic prefix, and provides K received samples for each received transformed symbol. A serial-to-parallel converter 512 provides the K received samples in parallel form. An FFT unit 514 transforms the K received samples to the frequency domain with a K-point FFT and provides K received symbols $\tilde{x}(k)$ for the K total subbands. Demultiplexer 162 passes the received symbols from multi-carrier demodulator 160 to multi-carrier RX data processor 170 if the multi-carrier signal is being received.

Within RX data processor 170, a zero removal unit 520 removes the received symbols for the guard subbands and provides the received symbols for the usable subbands. A parallel-to-serial converter 524 serializes the received symbols from unit 520. A symbol demapper/detector 526 performs data detection (e.g., matched filtering, equalization, and so on) on the received symbols with a channel estimate and provides detected symbols $\hat{s}(k)$, which are estimates of the data symbols $s(k)$ generated by transmitting station 110. A deinterleaver/decoder 528 then deinterleaves and decodes the detected symbols $\hat{s}(k)$ and provides decoded data for the multi-carrier signal.

Figure 6:
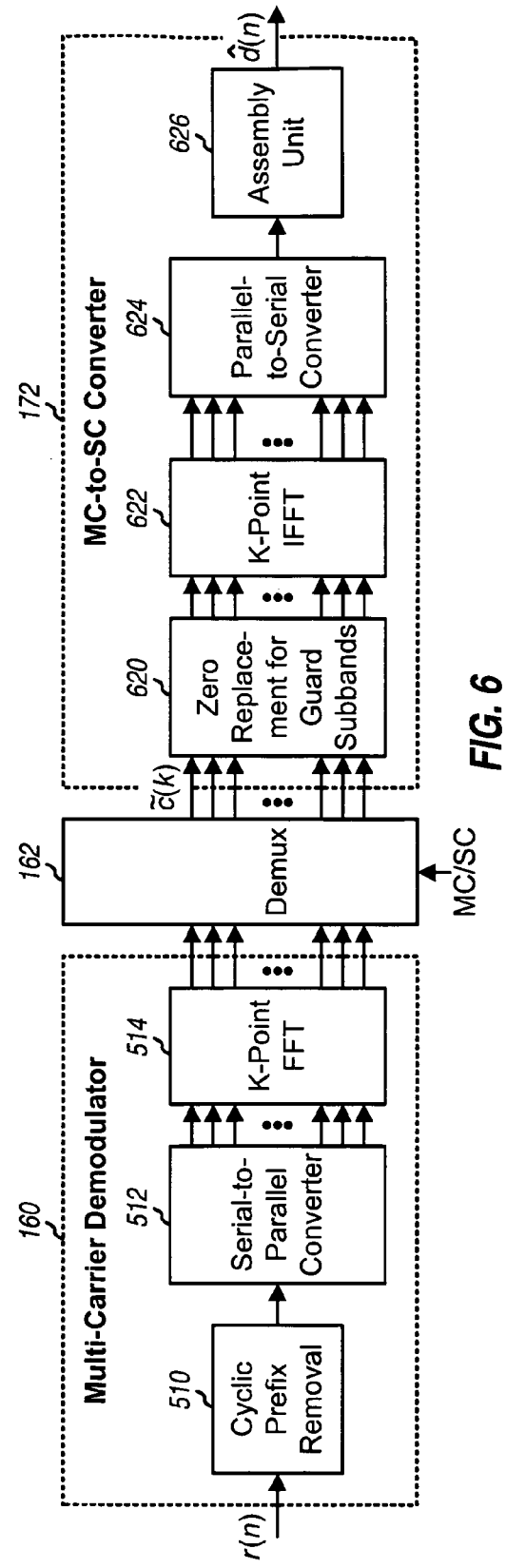
FIG. 6 shows a block diagram of a multi-carrier to single-carrier (MC-to-SC) converter at the receiving station.

FIG. 6 shows a block diagram of an embodiment of MC-to-SC converter 172 at receiving station 150. Multi-carrier demodulator 160 processes the received samples as described above for FIG. 5 and provides received symbols $\tilde{c}(k)$ for the K total subbands. However, the cyclic prefix removal by unit 510 is dependent on the cyclic prefixes, if any, inserted for the single-carrier signal by transmitting station 110. For example, unit 510 may omit the cyclic prefix removal if cyclic prefixes are not appended for the single-carrier signal. Unit 510 may also remove a shortened cyclic prefix, a normal cyclic prefix, or an extended cyclic prefix for each received OFDM symbol, depending on the length of the cyclic prefixes appended by transmitting station 110. In general, unit 510 may or may not remove the cyclic prefix for the single-carrier signal depending on the receiver processing for the single-carrier signal. Demultiplexer 162 passes the received symbols from multi-carrier demodulator 160 to MC-to-SC converter 172 if the single-carrier signal is being received.

Within MC-to-SC converter 172, a zero replacement unit 620 replaces the received symbols for the G guard subbands with zero symbols and provides received symbols and zero symbols for the K total subbands. An IFFT unit 622 obtains the K symbols for each OFDM symbol period, transforms these K symbols to the time domain with a K-point IFFT, and provides K time-domain converted samples. A parallel-to-serial converter 624 serializes the K converted samples from IFFT unit 622 and provides a segment of converted samples. An assembly unit 626 obtains the segment of converted samples for each OFDM symbol period in which the single-carrier signal is transmitted and removes converted samples in the segment corresponding to the padding inserted by transmitting station 110. Assembly unit 626 also concatenates the segments of converted samples obtained for different OFDM symbol periods, if appropriate, and provides converted samples $\hat{d}(n)$ for the single-carrier signal. The converted samples $\hat{d}(n)$ are estimates of the data samples d(n) sent by transmitting station 110.

Figure 7:
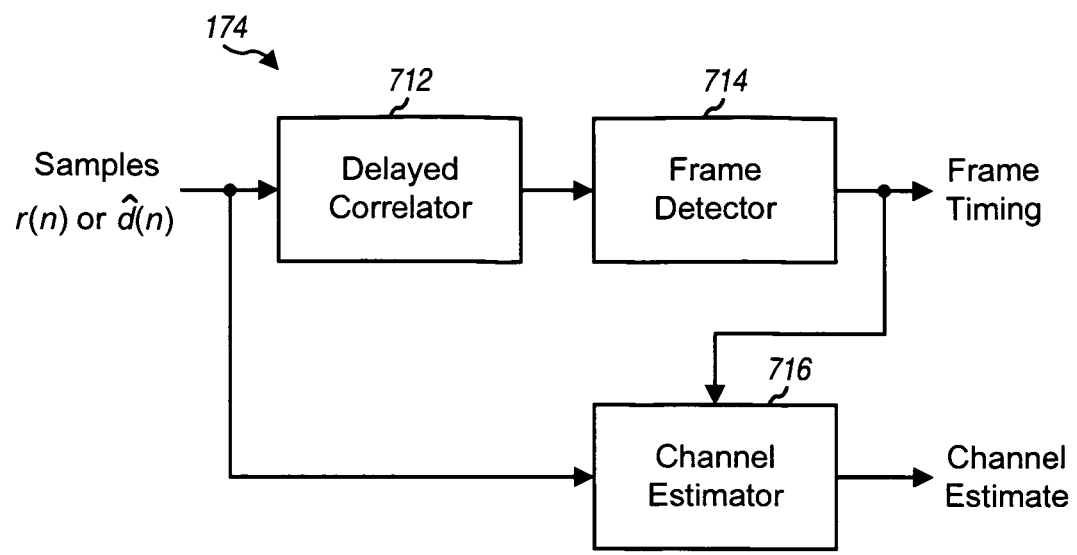
FIG. 7 shows a block diagram of a single-carrier RX data processor for a pilot.

Single-carrier RX data processor 174 processes the converted samples $\hat{d}(n)$ for the single-carrier signal in a manner that is complementary to the processing performed by single-carrier TX data processor 122 at transmitting station 110. For example, RX data processor 174 may perform data detection, deinterleaving, and decoding, if the single-carrier signal carries signaling or traffic data. RX data processor 174 may also perform time synchronization, frequency estimation, channel estimation, and so on, if the single-carrier signal carries a pilot. 501 FIG. 7 shows a block diagram of an embodiment of single-carrier RX data processor 174, which processes a pilot sent in the single-carrier signal. Processor 174 is for an exemplary pilot transmission scheme whereby the pilot is composed of multiple identical sequences of L data samples. These multiple sample sequences may be obtained by (1) transmitting L pilot symbols on every m-th subbands in one OFDM symbol period, where m>1 and L=K/rm, or (2) transmitting the same set of pilot symbols in multiple OFDM symbol periods, where L=K. The single-carrier signal is time division multiplexed with the multi-carrier signal in this example.

As shown in FIG. 7, RX data processor 174 may obtain the received samples r(n) directly from receiver unit 154. Within RX data processor 174, a delayed correlator 712 performs correlation between the received samples r(n) and the delayed received samples r(n−L) for each sample period and generates a correlation result that indicates the energy of the received pilot for that sample period. Frame detector 714 receives the correlation results for different sample periods and detects for the presence of the pilot in the single-carrier signal. If the pilot is sent periodically (e.g., at the start of each frame), then frame detector 714 provides the frame timing based on the detected pilot.

A channel estimator 716 may also obtain the received samples r(n) directly from receiver unit 154 and the frame timing from detector 714. Channel estimator 716 derives an estimate of the channel response based on the received samples for the pilot, as indicated by the frame timing. The channel estimation may be performed in various manners, as is known in the art. Channel estimator 716 provides the channel estimate used for data detection by symbol demapper/detector 526 within RX data processor 170 in FIG. 5.

As also shown in FIG. 7, delayed correlator 712 and channel estimator 716 may receive and process the converted samples d̂(n) from MC-to-SC converter 172 instead of the received samples r(n) from receiver unit 154. Delayed correlator 712 and channel estimator 716 may also process the received symbols c̃(k) from demultiplexer 162 or the received symbols from zero replacement unit 622 in FIG. 6.

In general, for the single-carrier signal, receiving station 150 may process the received samples r(n) from receiver unit 154, the received symbols c̃(k) from demultiplexer 162, or the converted samples d̂(n) from MC-to-SC converter 172. The processing performed by receiving station 150 for the single-carrier signal is dependent on the type of data being sent on this signal (e.g., traffic data, signaling, or pilot). If receiving station 150 processes the received symbols c̃(k) or the converted samples d̂(n), then cyclic prefix removal unit 510 within multi-carrier demodulator 160 removes the cyclic prefix (if any) that is appended to each OFDM symbol for the single-carrier signal by multi-carrier modulator 128 at transmitting station 110.

FIG. 8 shows a process 800 for transmitting a single-carrier signal/waveform using multi-carrier modulation and the unified pulse shaping techniques. The single-carrier/input waveform is partitioned into at least one input segment, with each input segment containing up to K samples (block 812). Each input segment is padded, if needed, with a sufficient number of zero samples to form a corresponding padded segment containing K samples (block 814). Each padded segment is transformed from the time domain to the frequency domain (e.g., with a K-point FFT) to generate a corresponding frequency-domain segment with K symbols (block 816). For each frequency-domain segment, the symbols corresponding to the guard subbands are set to zero (block 818). Each frequency-domain segment, with zeros for the guard subbands, is transformed from the frequency domain to the time domain (e.g., with a K-point IFFT) to generate a corresponding time-domain segment, which is also called a transformed symbol (block 820). A cyclic prefix may or may not be appended to each time-domain segment, depending on the system design (block 822). Each time-domain segment is then filtered with a pulse shaping response to generate an output signal/waveform (block 824). The pulse shaping response is selected to meet the spectral mask for the system.

FIG. 9 shows a process 900 for receiving a single-carrier signal/waveform sent using multi-carrier modulation and the unified pulse shaping techniques. At least one received OFDM symbol is obtained. If a cyclic prefix is appended for each received OFDM symbol, then this cyclic prefix is removed to obtain a corresponding received transformed symbol (block 912). Each received transformed symbol is transformed from the time domain to the frequency domain (e.g., with a K-point FFT) to generate a corresponding frequency-domain segment with K symbols (block 914). For each frequency-domain segment, the symbols corresponding to the guard subbands are set to zero (block 916). Each frequency-domain segment, with zeros for the guard subbands, is transformed from the frequency domain to the time domain (e.g., with a K-point IFFT) to generate a corresponding time-domain segment (block 918). If the transmitting station padded any segment, then the samples in each time-domain segment corresponding to the padding are removed (block 920). The time-domain segment(s) for the received OFDM symbol(s) are assembled to generate a received signal/waveform for the transmitted single-carrier signal/waveform (block 922).

FIG. 9 shows one method of processing a single-carrier signal sent using multi-carrier modulation. This single-carrier signal may also be processed in other manners. The receiver may process the single-carrier signal in both the frequency domain and time domain (as shown in FIG. 9). The receiver may also process the single-carrier signal completely in the time domain, and the cyclic prefix may or may not be removed depending on the receiver processing.

The unified pulse shaping techniques described herein may be used for a transmitting station equipped with a single antenna, as shown in FIG. 1A. These techniques may also be used for a transmitting station equipped with multiple antennas. In this case, one multi-carrier modulator 128 may be used for each antenna at the multi-antenna station.

The unified pulse shaping techniques described herein may be implemented by various means. For example, these techniques may be implemented in hardware, software, or a combination thereof. For a hardware implementation, at a transmitting station, the processing units used to process a single-carrier signal and perform unified pulse shaping may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. At a receiving station, the processing units used to process signals sent using unified pulse shaping may also be implemented within one or more ASICs, DSPs, processors, and so on.

For a software implementation, the unified pulse shaping techniques may be implemented with modules (e.g., procedures, functions, and so on) that perform the functions described herein. The software codes may be stored in a memory unit (e.g., memory unit 142 in FIG. 1A or memory unit 182 in FIG. 1B) and executed by a processor (e.g., controller 140 or 180). The memory unit may be implemented within the processor or external to the processor.

As used herein, OFDM may also include an orthogonal frequency division multiple access (OFDMA) architecture where multiple users share the OFDM channels.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of processing an input waveform in a communication system, comprising:
    partitioning the input waveform into at least one input segment;
    transforming the at least one input segment from time domain to frequency domain to generate at least one frequency-domain segment;
    setting at least one symbol corresponding to a guard subband in the at least one frequency-domain segment to zero;
    transforming the at least one frequency-domain segment from the frequency domain to the time domain to generate at least one time-domain segment;
    multiplexing a set of multi-carrier transmit symbols with a set of single carrier frequency domain converted symbols of the at least one frequency-domain segment; and
    filtering the at least one time-domain segment with a pulse shaping response to generate an output waveform to meet a spectral mask for the communication system by changing the guard subband and the pulse shaping response, wherein the pulse shaping response comprises unified pulse shaping techniques in conjunction with single and multi-carrier modulation schemes, and wherein the changing the guard subband comprises changing the number of guard subbands at two edges of the at least one frequency-domain segment to meet the spectral mask for the communication system.

2. The method of claim 1, further comprising:
    appending a cyclic prefix to each of the at least one time-domain segment.

3. The method of claim 1, wherein the partitioning the input waveform into at least one input segment comprises
    partitioning the input waveform into at least one input segment, each of the at least one input segment including up to K samples, where K is a total number of subbands.

4. The method of claim 3, further comprising:
    padding each of the at least one input segment, if needed, to form a corresponding padded segment of length K.

5. The method of claim 3, wherein the transforming the at least one input segment from the time domain to the frequency domain comprises
    performing a K-point fast Fourier transform (FFT) on each of the at least one input segment to generate a corresponding frequency-domain segment.

6. The method of claim 3, wherein the transforming the at least one frequency-domain segment from the frequency domain to the time domain comprises
    performing a K-point inverse fast Fourier transform (IFFT) on each of the at least one frequency-domain segment to generate a corresponding time-domain segment.

7. An apparatus in a communication system, comprising:
    a converter that partitions an input waveform into at least one input segment and that transforms the at least one input segment from time domain to frequency domain to generate at least one frequency-domain segment, the converter sets at least one symbol in the at least one frequency-domain segment for at least one guard subband to zero;
    a modulator that transforms the at least one frequency-domain segment from the frequency domain to the time domain to generate at least one time-domain segment;
    a multiplexer that multiplexes a set of multi-carrier transmit symbols with a set of single carrier frequency domain converted symbols of the at least one frequency-domain segment; and
    a filter that filters the at least one time-domain segment to generate a first output waveform to meet a spectral mask for the communication system by changing the at least one guard subband and a pulse shaping response, wherein the pulse shaping response comprises unified pulse shaping techniques in conjunction with single and multi-carrier modulation schemes, and wherein the changing the at least one guard subband comprises changing the number of guard subbands at two edges of the at least one frequency-domain segment to meet the spectral mask for the communication system.

8. The apparatus of claim 7, wherein the filter further performs filtering on a multi-carrier input waveform to generate a second output waveform.

9. The apparatus of claim 7, wherein the modulator appends a cyclic prefix to each time-domain segment.

10. An apparatus in a communication system, comprising:
    means for partitioning an input waveform into at least one input segment;
    means for transforming the at least one input segment from time domain to frequency domain to generate at least one frequency-domain segment;
    means for setting at least one symbol in the at least one frequency-domain segment for at least one guard subband to zero;
    means for transforming the at least one frequency-domain segment from the frequency domain to the time domain to generate at least one time-domain segment;
    means for multiplexing a set of multi-carrier transmit symbols with a set of single carrier frequency domain converted symbols of the at least one frequency-domain segment; and
    means for filtering the at least one time-domain segment to generate a first output waveform to meet a spectral mask for the communication system by changing the at least one guard subband and a pulse shaping response, wherein the pulse shaping response comprises unified pulse shaping techniques in conjunction with single and multi-carrier modulation schemes, and wherein the changing the at least one guard subband comprises changing the number of guard subbands at two edges of the at least one frequency-domain segment to meet the spectral mask for the communication system.

11. The apparatus of claim 10, further comprising:
    means for filtering at least one multi-carrier input waveform to generate a second output waveform.

12. The apparatus of claim 10, further comprising:
    means for appending a cyclic prefix to each time-domain segment.

13. A method of processing waveforms in a communication system, comprising:
    converting a single-carrier waveform to a multi-carrier format; and
    performing multi-carrier modulation on the converted single-carrier waveform to generate a first output waveform to meet a spectral mask for the communication system by changing a guard subband and a pulse shaping response, and that performs multi-carrier modulation on a multi-carrier waveform to generate a second output waveform, wherein the pulse shaping response comprises unified pulse shaping techniques in conjunction with single and multi-carrier modulation schemes, and wherein the changing the guard subband comprises changing the number of guard subbands at two edges of at least one frequency-domain segment of the converted single-carrier waveform to meet the spectral mask for the communication system.

14. The method of claim 13, wherein the converting the single-carrier waveform to the multi-carrier format comprises
partitioning the single-carrier waveform into at least one input segment,
transforming the at least one input segment from time domain to frequency domain to yield at least one frequency-domain segment; and
setting at least one symbol corresponding to the guard subband in the at least one frequency-domain segment to zero.

15. The method of claim 13, wherein the performing multi-carrier modulation on the converted single-carrier waveform comprises
transforming at least one frequency-domain segment for the converted single-carrier waveform from frequency domain to time domain to generate at least one time-domain segment, and
filtering the at least one time-domain segment to generate the first output waveform.

16. The method of claim 13, further comprising:
multiplexing the first output waveform and the second output waveform.

17. An apparatus in a communication system, comprising:
a converter that converts a single-carrier waveform to a multi-carrier format;
a modulator that performs multi-carrier modulation on the converted single-carrier waveform to generate a first output waveform to meet a spectral mask for the communication system by changing at least one guard subband and a pulse shaping response, and that performs multi-carrier modulation on a multi-carrier waveform to generate a second output waveform, wherein the pulse shaping response comprises unified pulse shaping techniques in conjunction with single and multi-carrier modulation schemes, and wherein the changing the at least one guard subband comprises changing the number of guard subbands at two edges of at least one frequency-domain segment of the converted single-carrier waveform to meet the spectral mask for the communication system; and
a multiplexer that multiplexes the first output waveform and the second output waveform.

18. The apparatus of claim 17, the converter partitions the single-carrier waveform into at least one input segment and transforms the at least one input segment from time domain to frequency domain to yield at least one frequency-domain segment.

19. The apparatus of claim 18, wherein the converter sets at least one symbol in the at least one frequency-domain segment for the at least one guard subband to zero.

20. The apparatus of claim 17, further comprising:
a pulse shaping filter that performs filtering on an output of the modulator based on the pulse shaping response.

21. The apparatus of claim 17, wherein the single-carrier waveform is for a pilot.

22. The apparatus of claim 18, wherein the system utilizes orthogonal frequency division multiplexing (OFDM), and wherein each of the at least one input segment has a length that is compatible with an OFDM symbol.

23. An apparatus in a communication system, comprising:
means for converting a single-carrier waveform to a multi-carrier format; and
means for performing multi-carrier modulation on the converted single-carrier waveform to generate a first output waveform to meet a spectral mask for the communication system by changing at least one guard subband and a pulse shaping response, and that performs multi-carrier modulation on a multi-carrier waveform to generate a second output waveform, wherein the pulse shaping response comprises unified pulse shaping techniques in conjunction with single and multi-carrier modulation schemes, and wherein the changing the at least one guard subband comprises changing the number of guard subbands at two edges of at least one frequency-domain segment of the converted single-carrier waveform to meet the spectral mask for the communication system.

24. The apparatus of claim 23, further comprising:
means for multiplexing the first output waveform and the second output waveform.

25. The apparatus of claim 23, further comprising:
means for partitioning the single-carrier waveform into at least one input segment;
means for transforming the at least one input segment from time domain to frequency domain to yield at least one frequency-domain segment; and
means for setting at least one symbol in the at least one frequency-domain segment for the at least one guard subband to zero.

26. A method of receiving a transmitted waveform in a communication system, comprising:
transforming at least one received transformed symbol from time domain to frequency domain to generate at least one frequency-domain segment;
setting at least one symbol in each of the at least one frequency-domain segment for at least one guard subband to zero;
transforming the at least one frequency-domain segment from the frequency domain to the time domain to generate at least one time-domain segment;
multiplexing a set of multi-carrier transmit symbols with a set of single carrier frequency domain converted symbols of the at least one frequency-domain segment; and
assembling the at least one time-domain segment to generate a waveform based on the transmitted waveform, wherein the transmitted waveform meets a spectral mask for the communication system by changing the at least one guard subband and a pulse shaping response, wherein the pulse shaping response comprises unified pulse shaping techniques in conjunction with single and multi-carrier modulation schemes, and wherein the changing the at least one guard subband comprises changing the number of guard subbands at two edges of the at least one frequency-domain segment to meet the spectral mask for the communication system.

27. The method of claim 26, further comprising:
serializing the at least one time-domain segment using a parallel-to-serial converter.

28. The method of claim 26, further comprising:
removing a cyclic prefix in each of at least one received orthogonal frequency division multiplexing (OFDM) symbol to obtain a corresponding received transformed symbol.

29. The method of claim 26, wherein the assembling the at least one time-domain segment comprises for each of the at least one time-domain segment, removing samples corresponding to padding.

30. An apparatus for receiving a transmitted waveform in a communication system, comprising:
a demodulator that transforms at least one received transformed symbol from time domain to frequency domain to generate at least one frequency-domain segment;
a converter that sets at least one symbol in the at least one frequency-domain segment for at least one guard subband to zero, that transforms the at least one frequency-domain segment from the frequency domain to the time domain to generate at least one time-domain segment, and that assembles the at least one time-domain segment to generate a waveform based on the transmitted waveform, wherein the transmitted waveform meets a spectral mask for the communication system by changing the at least one guard subband and a pulse shaping response, wherein the pulse shaping response comprises unified pulse shaping techniques in conjunction with single and multi-carrier modulation schemes, and wherein the changing the at least one guard subband comprises changing the number of guard subbands at two edges of the at least one frequency-domain segment to meet the spectral mask for the communication system; and
a multiplexer that multiplexes a set of multi-carrier transmit symbols with a set of single carrier frequency domain converted symbols of the at least one frequency-domain segment.

31. The apparatus of claim 30, wherein the demodulator removes samples corresponding to padding for each of the at least one time-domain segment.

32. The apparatus of claim 30, within the demodulator removes a cyclic prefix in each of at least one received orthogonal frequency division multiplexing (OFDM) symbol to obtain a corresponding received transformed symbol.

33. An apparatus for receiving a transmitted waveform in a communication system, comprising:
means for transforming at least one received transformed symbol from time domain to frequency domain to generate at least one frequency-domain segment;
means for setting at least one symbol corresponding to at least one guard subband in the at least one frequency-domain segment to zero;
means for transforming the at least one frequency-domain segment from the frequency domain to the time domain to generate at least one time-domain segment; and
means for assembling the at least one time-domain segment to generate a waveform based on the transmitted waveform, wherein the transmitted waveform meets a spectral mask for the communication system by changing the at least one guard subband and a pulse shaping response, wherein the pulse shaping response comprises unified pulse shaping techniques in conjunction with single and multi-carrier modulation schemes, and wherein the changing the at least one guard subband comprises changing the number of guard subbands at two edges of the at least one frequency-domain segment to meet the spectral mask for the communication system; and
means for multiplexing a set of multi-carrier transmit symbols with a set of single carrier frequency domain converted symbols of the at least one frequency-domain segment.

34. The apparatus of claim 33, further comprising:
means for removing samples corresponding to padding for each of the at least one time-domain segment.

35. The apparatus of claim 33, further comprising:
means for removing a cyclic prefix in each of at least one received orthogonal frequency division multiplexing (OFDM) symbol to obtain a corresponding received transformed symbol.

36. A method of receiving an input waveform in a communication system, comprising:
receiving the input waveform comprising a single-carrier waveform that has been converted to a multi-carrier format and processed with multi-carrier modulation;
processing the input waveform to recover the single-carrier waveform, wherein the input waveform meets a spectral mask for the communication system by changing a guard subband and a pulse shaping response, wherein the pulse shaping response comprises unified pulse shaping techniques in conjunction with single and multi-carrier modulation schemes, and wherein the changing the guard subband comprises changing the number of guard subbands at two edges of at least one frequency-domain segment of the recovered single-carrier waveform to meet the spectral mask for the communication system; and
performing multi-carrier demodulation on the input waveform to generate a multicarrier waveform, and processing the multi-carrier waveform to obtain the single-carrier waveform.

37. The method of claim 36, wherein the performing multicarrier demodulation comprises
removing a cyclic prefix in at least one received orthogonal frequency division multiplexing (OFDM) symbol to obtain a corresponding received transformed symbol,
transforming at least one received transformed symbol from time domain to frequency domain to generate at least one frequency-domain segment, and
setting at least one symbol in each frequency-domain segment to zero.

38. The method of claim 37, wherein the processing the multi-carrier waveform comprises
transforming the at least one frequency-domain segment, with at least one zero for each frequency-domain segment, from the frequency domain to the time domain to generate at least one time-domain segment, and
assembling the at least one time-domain segment to recover the single-carrier waveform.

39. The method of claim 36, wherein the processing the input waveform comprises processing the input waveform completely in time domain to recover the single-carrier waveform.

* * * * *